March 20, 1962 R. BUSER 3,026,509

CONVERSION OF DECIMAL-CODED BINARY NUMBERS INTO DECIMAL NUMBERS

Filed April 1, 1957

Inventor.
Rudolf Buser.
By George A. Auer Atty.

United States Patent Office 3,026,509

Patented Mar. 20, 1962

3,026,509

CONVERSION OF DECIMAL-CODED BINARY NUMBERS INTO DECIMAL NUMBERS

Rudolf Buser, Munich, Germany, assignor to Siemens & Halske Aktiengesellschaft Berlin and Munich, a corporation of Germany Filed Apr. 1, 1957, Ser. No. 649,884
Claims priority, application Germany Apr. 6, 1956
4 Claims. (Cl. 340—347)

This invention is concerned with a converter for the conversion of decimal-coded binary numbers present, in the form of pulses, into decimal numbers.

In computer technique, binary numbers are generally used for computation operations since these numbers afford the greatest possible assurance with a relatively small expenditure of switch means. Since, however, as a rule both the values to be introduced into a machine and the calculated values must for reasons of distinctness be in decimal numbers, there are provided on the input and output of the machine separate converters which convert the decimal numbers into binary numbers and vice-versa. This conversion process, particularly when there are concerned numbers having a large number of places, is particularly difficult when the binary number is present in a purely binary notation.

In order to be able to retain the advantages of binary numbers during the computation process itself and nevertheless maintain the conversion process as simple as possible, it has become known to code each individual place of the decimal number individually in the binary number system. If therefore for instance the number 578 is to be reproduced in such a binary notation, the number 8, the number 7 and the number 5 are binary-coded separately, in particularly one after the other and introduced into the core of the computer.

The present invention relates to a converter for converting decimal-coded binary numbers into decimal numbers, which is so dimensioned that any desired numerical code, whether it be in the form of a tetrad code, a 2-from 5 code or a 2-from 7 code can be used for a conversion. In general, the converter in accordance with the invention is thus concerned with an arrangement for converting binary numbers, present in the form of pulses, into numbers of other and preferably lower digit sequence (decimal number), the number being coded separately in the code of higher digit sequence in accordance with the places or groups of places of the number of the other digit sequence and the places of the number of higher digit sequence allocated to each place of the number of lower digit sequence being present simultaneously, at least for the conversion operation. A prerequisite for the converter in accordance with the invention is, therefore, that the binary numbers associated with a very definite place of the decimal number to be calculated must be present simultaneously, therefore, in parallel notation, while it is immaterial whether the binary numbers associated with the further places of the decimal number are then associated in serial notation or in further parallel notation. In order to be able to fulfill this prerequisite in every case, that is, in order to be able to use the converter universally, it is necessary, in machines in which pure serial notation is employed, to convert the corresponding groups of binary numbers by means of transit-time or storage members into a parallel notation.

The converter in accordance with the invention comprises as many magnet cores with at least approximately rectangular hysteresis loop, with defined normal condition produced by pre-magnetization, as values which a place (or group of places) of the number of lower digit sequence can assume, and means for linking each line which carries a pulse (information line) with each of the cores, the direction of winding of each individual linking with a core being such that when a pulse is to occur on a corresponding line for an equivalent number, a direction of flow (positive direction of flow) directed opposite the bias or pre-magnetization is produced in the corresponding core, while the lines over which no pulse is to flow in the case of the desired number are linked in the reverse direction with the core, at least individual cores being linked singly or multiply with a timing line in such a manner that for a tipping of a given core, partial currents which are acting too much or too little are counter-balanced or supplemented respectively.

In the case of the converter in accordance with the invention, therefore, there is provided for each possible digit of a place of a decimal number and therefore, for instance, for the digits 0 to 9, one magnetic core, each of which is brought into a precisely defined position by means of a pre-magnetization winding and which is so acted on by a coincidence formation of several currents that it is caused to tip only upon the occurrence of currents in very specific lines, so that a pulse then occurring in its output winding indicates that the binary number fed to the converter corresponds specifically to the decimal number or digit which is associated with the core. Since it is not possible with the individual pulses of the binary number to obtain for all cores an unequivocal coincidence action to the effect that only one core tips, it is necessary, in accordance with a further feature of the invention, to supplement or compensate the remaining partial currents or the partial currents present in excess respectively by pulses of the timing pulse.

Before going into details of the converter in accordance with the invention, there shall be first of all explained, by way of example, a numerical code such as can be present in practice as "decimal-coded binary code" and as is then available for a conversion operation.

The invention is explained with reference to the drawing, in which.

Figure 1:
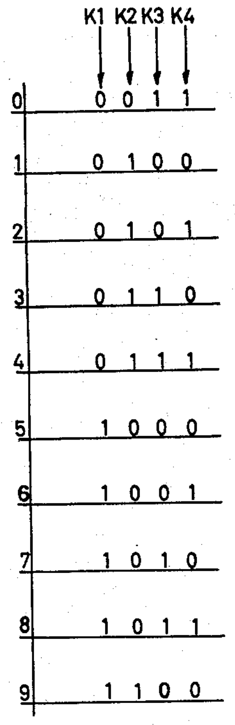
FIG. 1 shows a numerical code employed in the present invention.

FIG. 1 shows such a code, it being assumed that pulses can occur on four lines K1 to K4. The numerical code is now so selected that in case of the decimal digit 0, for instance, a pulse occurs simultaneously only on lines K3 and K4 while lines K1 and K2 remain without current. If the decimal digit 5 is to be realized, then there is a pulse, for instance, solely on line K1, which corresponds to a "1" in the diagram shown while the other lines are without current. As shown in the diagram, there is in each case a clear association between the pulse distribution of the four lines K1 to K4 and the digits 0 to 9 of the decimal numerical system.

Within a computing machine, the individual numbers are now present in such pulse groups and the individual places of a decimal number can be guided one after the other over the same lines and the switch members of the machine. The converter in accordance with the invention is now to determine the associated decimal digit unequivocally from such a pulse combination.

Figure 2:
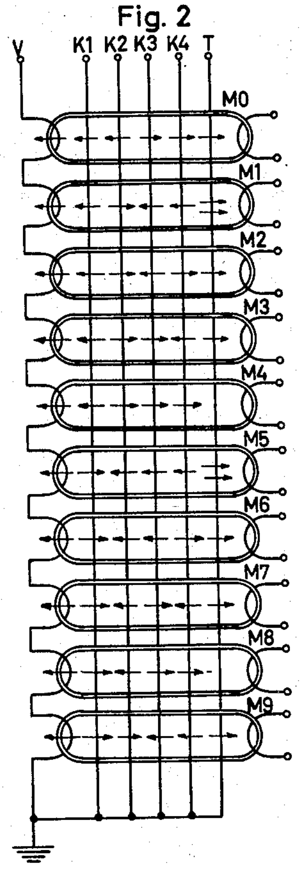
FIG. 2 shows a magnetic core code converter.

For this purpose, as clearly noted in FIG. 2, there are provided ten magnet cores all of which are linked with a pre-magnetization winding V. The individual magnet cores have substantially a rectangular hysteresis loop, the bias or pre-magnetization and the current going through this winding being so selected that in the normal condition the magnetizing condition of this core assumes a well defined position.

Figure 4:
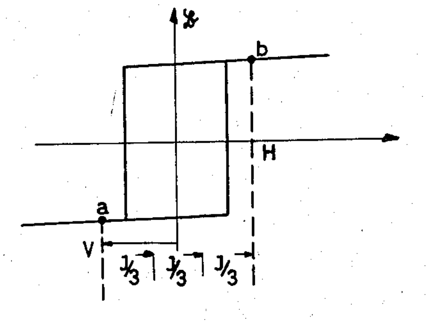
FIG. 4 shows a hysteresis loop of one of the cores employed in the present invention.

In FIG. 4 is shown a hysteresis loop of one of the cores, the vector V indicating the direction of the field induced by the bias or premagnetization current.

The initial condition of the core thus corresponds to the point "*a*" on the magnetization curve of FIG. 4. Furthermore, as is apparent from FIG. 2, each individual core is linked with each of the four information lines K1 to K4 and with timing line T. Arrows indicate how the winding direction of the individual lines with the corresponding cores is to be directed so that upon the occurrence of a pulse in this line, a very definite field is produced. This field should in accordance with the invention be so directed that the inductive flow is opposite to the pre-magnetization field upon the occurrence of a pulse, when, and only when, the binary number equivalent to the decimal number associated with the core has a "1" at this place in the diagram in accordance with FIG. 1. The magnitude of the pulses or the number of windings is so selected that the corresponding core can tip when, and only when, three arrows in the direction opposite to the bias magnetization are additive without the bias magnetization being added by a pulse in a winding of opposite direction of flux. Two arrows along the timing line T within a core indicate that an individual timing pulse will produce a double flux.

If now one of the possible pulse combinations occurs within the lines K1 to K4, a core will be caused to tip, as will be presently explained in further detail, so that then there will be induced in the output winding a pulse which can be used to indicate the corresponding decimal digit. This is also apparent from FIG. 4, since the magnetization state of the core assumes position "*b*" when, and only when, three arrows all of which correspond to an arrow J/3 occur simultaneously, when an output pulse is in the known manner produced by the "tipping" and the subsequent return into position "*a*."

If, therefore, for instance the pulse combination 0110 is given over the lines K1 to K4, the core M3 will be caused to tip since the magnetic fluxes which are produced over the line K2, the line K3 and the line T are additive. Another core, for instance the core M0 will not tip since, while the lines K3 and T also produce a magnetic flux directed opposite the bias magnetization, this flux is at first counteracted in part by the counterflux of the line K2, aside from the fact that two partial fluxes alone would not be sufficient to tip the core. The core M1, although it receives a total of three partial currents, namely over the line K2 and the line T for the tipping, cannot tip since its bias magnetization is correspondingly amplified by the flux taking place over line K3 so that the three first mentioned fluxes are not sufficient to cause this core to tip.

The embodiment of a converter in accordance with FIG. 2, may be variously modified. For instance, it is clearly apparent that care can be taken, by suitable selection and different manner of feed of the timing pulses, that a core is caused to tip already by the addition of two partial currents. In such case, the cores which are affected, for example, by three partial currents, based on the code explained, must be exposed over the timing line to a countercurrent in order to obtain unequivocal conditions.

Figure 3:
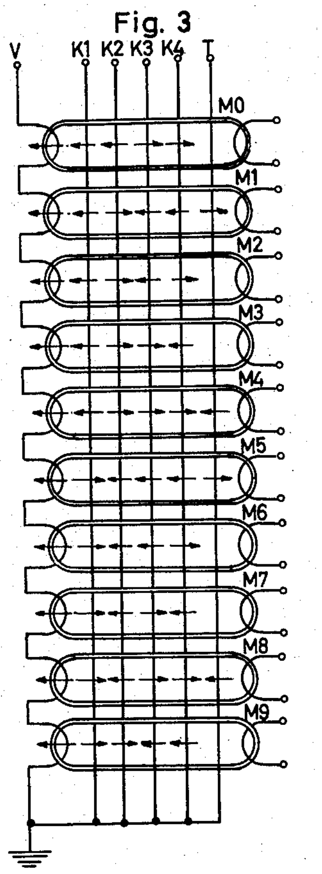
FIG. 3 shows a second embodiment constructed in substance in the same manner as the example shown in FIG. 2.

FIG. 3 shows a corresponding example, constructed in substance in the same manner as the example shown in FIG. 2. The individual pulses or the windings traversed by the pulses are in this special case so dimensioned that a core is caused to tip already upon the occurrence of pulses in two lines with corresponding direction of winding. Since three partial currents can occur in cores M4 and M8, these cores will be provided with a timing winding which produces a reverse flow, while thereupon all the cores in connection with which just two pulses (ones) occur in the desired state, do without the aid of bias magnetization and the cores (M1 and M5) in which at the desired time only a single pulse flows are equipped with a supporting bias magnetization winding.

The example last described also shows that the converter in accordance with the invention can be modified further. It is in particular possible to replace the absent flux of the pulses by double the amount of winding. In this case, a supply of timing pulses may under some circumstances be omitted entirely. However, such an arrangement has the disadvantage over the arrangements described that the cores must be equipped with different windings, which is cumbersome in manufacture since in general there would be concerned probably very small magnet cores. Furthermore, the output lines would become differently loaded.

The supply of the bias magnetization current in pulse form also opens ways for modifications of the converter in accordance with the invention; suitable selection of the bias magnetization winding making it in such case possible to omit at least the supply of an oppositely directed timing pulse.

Changes may be made within the scope and spirit of the appended claims.

I claim:

1. A converter for binary numbers present in the form of pulses into numbers of lower digit sequence, wherein the numbers in the code of the higher digit sequence after the places of the number of lower digit sequence are separately coded and wherein the places of the number of higher digit sequence associated with each place of the number of lower digit sequence are at least for the conversion operation simultaneously present in parallel, comprising a plurality of magnet cores each with at least approximately rectangular hysteresis loop, the number of said cores corresponding to the number of different values which can be assumed by a place of the number of lower digit sequence, a premagnetizing winding identically linked with each of said magnet cores, said premagnetizing winding carrying continuously constant current to effect restoration of all said cores into normal position thereof, a plurality of information lines in number corresponding to the places of the binary number which is to be converted, each of said information lines being linked with each core, the direction of winding of each individual linking with a core being such that when an impulse occurs on the corresponding line for an equivalent number, a flux is produced in the corresponding core which is opposite to the flux produced by said premagnetization, information lines over which no impulse is supplied being linked with the corresponding core in reverse direction of winding, and a timing line linked with at least some of said cores for supplying current thereto for the purpose of augmenting the effect of partial currents flowing respectively in the information lines and the premagnetization winding to cause tipping of the corresponding cores.

2. A converter according to claim 1, wherein the flux effected in parallel by the individual pulses causes reversal of magnetization of a magnet core precisely at the highest possible number of simultaneously occurring pulses.

3. A converter according to claim 1, wherein one of said information lines is linked with at least one of said cores by a greater number of linking windings to produce a correspondingly increased augmenting flux.

4. A converter according to claim 2, wherein one of said information lines is linked with at least one of said cores by a greater number of linking windings to produce a correspondingly increased augmenting flux.

References Cited in the file of this patent

UNITED STATES PATENTS

| | | |
|---|---|---|
| 2,696,347 | Lo | Dec. 7, 1954 |
| 2,733,861 | Rajchman | Feb. 7, 1956 |
| 2,734,182 | Rajchman | Feb. 7, 1956 |
| 2,768,367 | Rajchman | Oct. 23, 1956 |
| 2,846,671 | Yetter | Aug. 5, 1958 |